Figure 5:
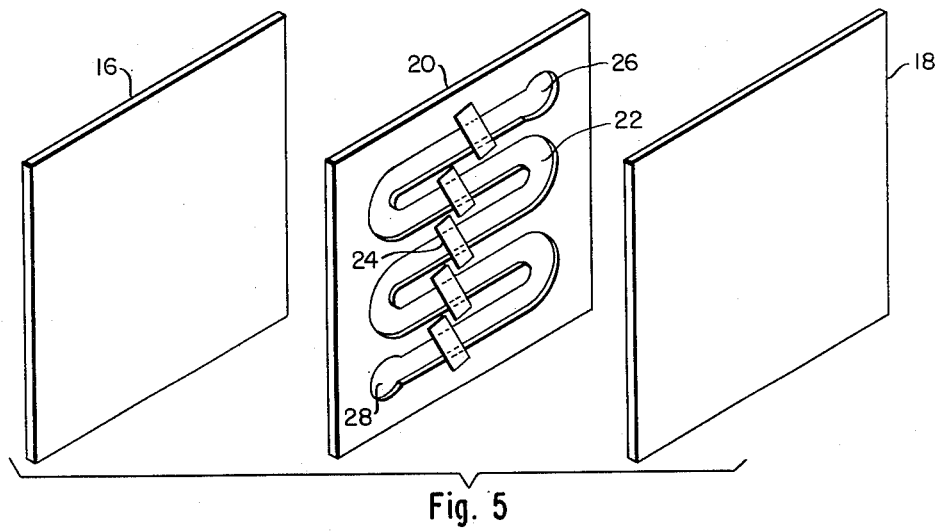

May 17, 1955    N. W. ROSENBERG    2,708,658
APPARATUS FOR REMOVING ELECTROLYTES FROM SOLUTIONS
Filed July 18, 1952      4 Sheets-Sheet 1
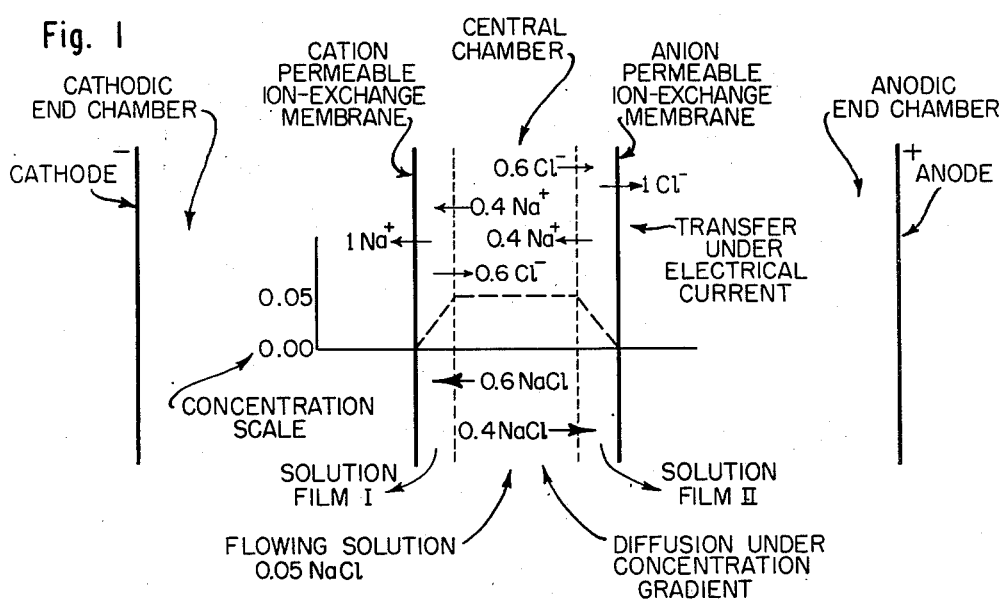
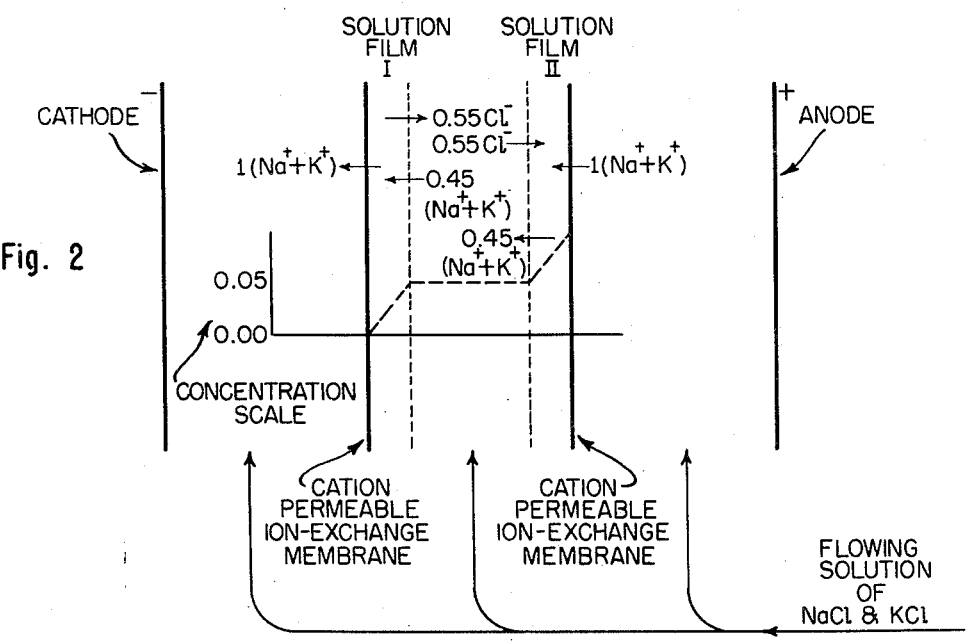
INVENTOR.
BY Norman W. Rosenberg
Kenway, Jenney, Witter & Hildreth
Attys.

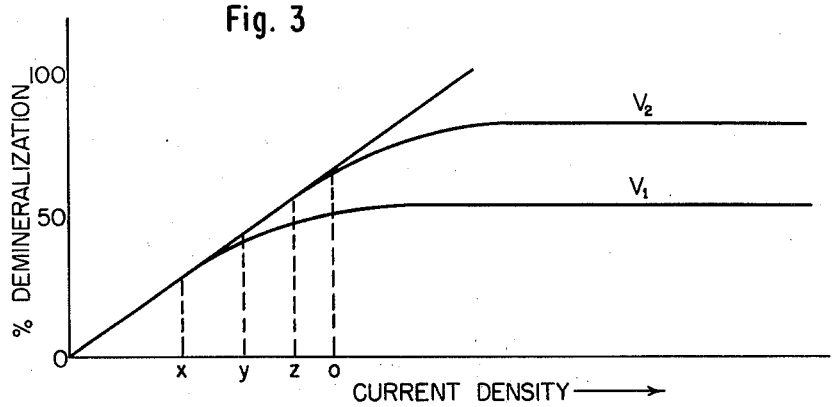
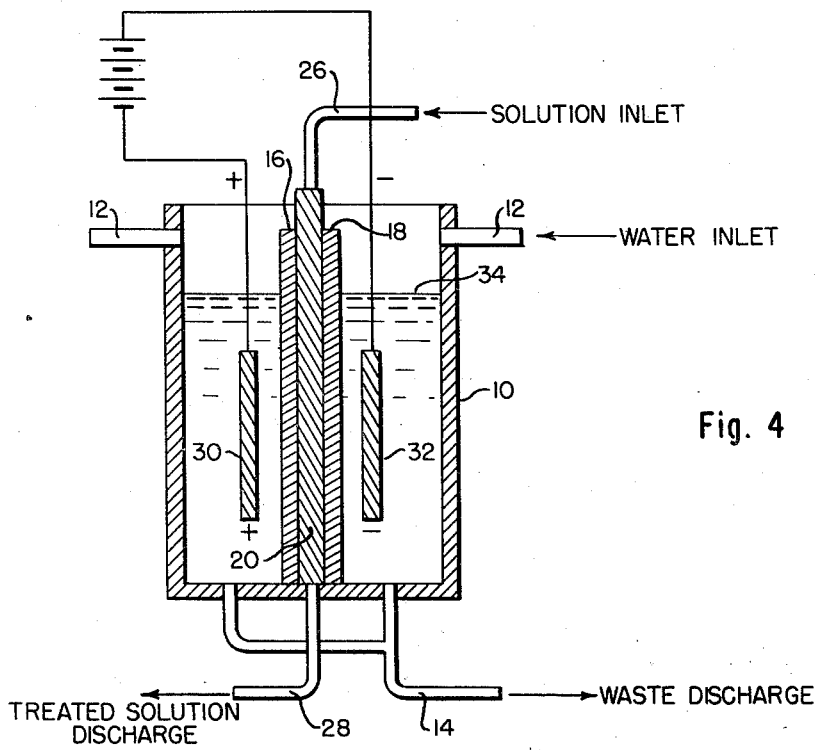

May 17, 1955   N. W. ROSENBERG   2,708,658
APPARATUS FOR REMOVING ELECTROLYTES FROM SOLUTIONS
Filed July 18, 1952   4 Sheets-Sheet 3

INVENTOR.
BY Norman W. Rosenberg
Kenway, Jenney, Witter & Hildreth
Attys.

United States Patent Office 2,708,658
Patented May 17, 1955

2,708,658

APPARATUS FOR REMOVING ELECTROLYTES FROM SOLUTIONS

Norman W. Rosenberg, Newton, Mass., assignor to Ionics, Incorporated, Cambridge, Mass., a corporation of Massachusetts Application July 18, 1952, Serial No. 299,592

8 Claims. (Cl. 204—301)

The present invention relates to apparatus by means of which electrolytes may be removed continuously from solutions. One aspect of the invention comprises an improvement on the apparatus disclosed in application Ser. No. 146,706, filed February 27, 1950, by Walter Juda and Wayne A. McRae (now Patent 2,636,852, issued April 28, 1953).

In the copending application referred to above there is disclosed apparatus comprising essentially a central chamber and two end chambers. The end chambers contain an electrolyte solution and electrodes. When a D. C. voltage is impressed upon the electrodes, one of them becomes a cathode and the other an anode, thereby making one end chamber, "the cathodic end chamber," and the other chamber, "the anodic end chamber." The central chamber is separated from the two end chambers by electrolytically conducting ion-exchange membranes, and contains, preferably, a flowing electrolyte solution. When it is desired to remove electrolyte continuously from the solution flowing through the central chamber, the membrane separating the central chamber from the cathodic end chamber is selectively permeable to cations and the membrane separating it from the anodic end chamber is selectively permeable to anions. Thus, on passage of D. C. current through this assembly, and on flowing solution through the central chamber, cations and anions are respectively carried by the current into the cathodic and anodic end chambers through the selective membranes, and, consequently, the solution in the central chamber is demineralized, at least in part. Electroneutrality is preserved in the end chambers by electrode reactions.

In operating apparatus of the type described, it has been discovered that, because of the change in transport number occurring at the interface of the solution and the ion exchange membranes in the central chamber, so-called polarized films form adjacent to the inner surface of both membranes when the solution in the central chamber is subjected to demineralization.

The present invention is based upon the discovery that the formation of polarized solution films can be effectively minimized over a wide range of current densities and concentrations, yielding correspondingly wider ranges of maximum current and voltage efficiencies, when the solution undergoing treatment is forced to follow a narrowly confined tortuous path while it is in contact with the membranes. For any given spacing between membranes such narrowly confined, tortuous paths cause an increase in the linear velocity of the flowing solution, thereby substantially reducing polarization effects. Incidentally, it is generally desirable to minimize the thickness of the space between membranes in order to minimize the solution resistance therein, as is well known.

The primary object of the invention is to increase the range of permissible current densities for any given concentration in which ions may be removed from solutions under optimum current and voltage efficiency.

Another object of the invention is to decrease the size and bulk of electrolyte removal apparatus.

An important feature of the invention resides in two membranes separated by a thin spacer having portions cut away to provide a continuous narrow tortuous channel between the membranes. In apparatus wherein demineralization (i. e. removal of electrolyte) is effected, the two membranes have different polarity in the sense that the transport number of any cation (or anion) differs in the two membranes; preferably, for high efficiency in such apparatus one membrane is selectively permeable to cations ("cation membrane") and the other membrane is selectively permeable to anions ("anion membrane").

Figure 6:
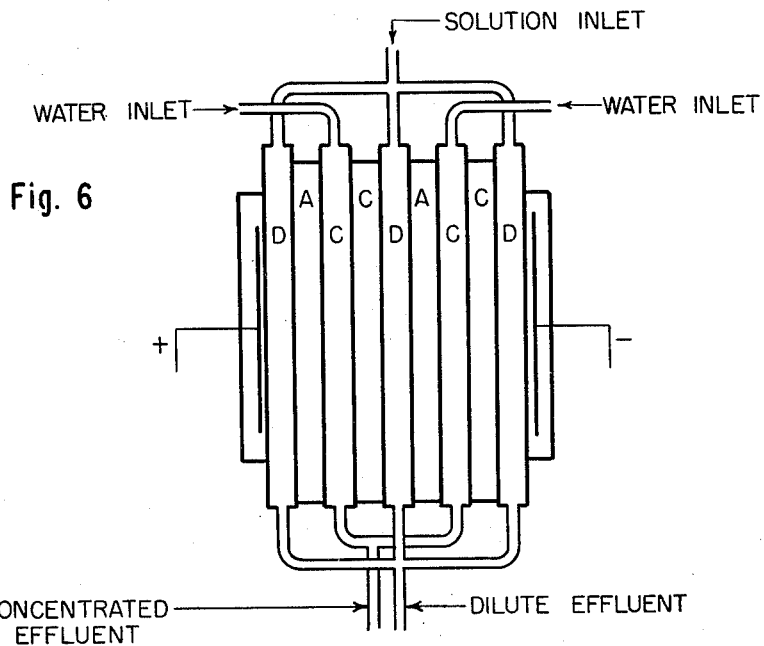

These and other objects and features of the invention will be more readily understood and appreciated from the following detailed description of a preferred embodiment thereof selected for purposes of illustration and shown in the accompanying drawing in which:

Figs. 1 and 2 are diagrams illustrating the nature of the polarized layers adjacent the membrane surfaces, Fig. 3 is a graph illustrating the principles involved in the operation of the device constructed in accordance with the invention, Fig. 4 is a diagrammatic representation of a single cell unit embodying the invention, Fig. 5 is an exploded view of two membranes and a spacer showing a narrowly confined tortuous path, Fig. 6 is a diagrammatic representation of a multiple chamber unit embodying the invention, and Figs. 7, 8, 9 and 10 are views in elevation of spacers incorporating alternative forms of tortuous channels.

Before describing the combination and elements comprising the invention, I shall first discuss briefly some of the factors which must be taken into consideration before the nature and scope of the invention can be fully appreciated.

To illustrate a possible mechanism, assume that the solution flowing through the central chamber is a .05 N aqueous sodium chloride solution, and that the cation and anion permeable membranes bounding the chamber are those described in the copending application referred to above. The transport numbers of sodium ion ($t_+$) and of chloride ion ($t_-$) in this salt solution are, respectively, about 0.4 and 0.6, whereas $t_+$ is nearly 1 in the cation membrane ($t_-$ about 0) and $t_-$ is nearly 1 in the anion membrane ($t_+$ about 0). Thus, under passage of current, the solution film adjacent to each membrane surface in the central chamber is electrically depleted of electrolyte rather than the bulk of solution in this central chamber, as schematically illustrated in Figure 1. In Figure 1 it is shown that each Faraday of electricity removes about 1 equivalent of sodium ion from the central chamber through the cation membrane into the cathodic end chamber and 1 equivalent of chloride ion through the anion membrane into the anodic end chamber giving an overall current efficiency of nearly 100%. Because of the change of transport number at the interfaces, however, the solution film I loses 0.6 of an equivalent of electrolyte and the solution film II loses 0.4 of an equivalent of electrolyte by electrical movement alone, whereas the bulk of solution in between the two films does not undergo concentration change. There are thus established concentration gradients which are schematically indicated by the dotted line in Fig. 1. Equalization of concentration in the central chamber then occurs by diffusion of electrolyte from the bulk solution into the films under the driving force of the concentration gradients as indicated in Fig. 1 by the solid arrows. The net result is a lowering of the average concentration in the solution during its flow through the central chamber. Under normal operation this decrease of average concentration in the solution results only in a small predicted increase of electrical resistance—corresponding to the concentration decrease—so long as the removal of salt from the films by the electric current does not exceed the supply of salt from the bulk solution into the films by concentration diffusion. Any such operation, realizing this condition results in optimum voltage efficiency and in optimum current efficiency, and is termed normal. If the current, however, is increased to the extent that diffusion can no longer maintain substantially equal salt concentration in the films and in the bulk, a "polarization" resistance will appear causing a decrease in voltage efficiency. Further if the salt depletion in the films is carried to a point where the supply of sodium ions in solution film I and/or of chloride ion in solution film II is insufficient to have each Faraday of electricity carried by sodium ions through the cation membrane and/or by chloride ions through the anion membrane, the balance of the current must be made up by decomposition products of water in the films, namely by hydrogen ions in film I and hydroxyl ions in film II. This requires the energy necessary for decomposing water and manifests itself in high resistance, in a lowering of the current efficiency and in pH changes on the faces of the membranes. The inner cation membrane surface becomes basic since hydrogen ion is removed from it, that of the anion membrane becomes acid because hydroxyl ion is removed from it. The latter condition is termed anomalous operation and results in poor performance of the apparatus, both with respect to current efficiency and voltage efficiency.

In apparatus wherein ions of the same sign are separated from each other, such as is described in the copending application Ser. No. 213,514, filed March 2, 1951, by Davis R. Dewey II and Edwin R. Gilliland, the two membranes are identical and a polarization film occurs only on one surface instead of both, as illustrated in Fig. 2.

For the latter case, for purposes of illustration, assume that a .05 N solution, .025 N in KCl, and .025 N in NaCl is fed under conditions of flow through the central chamber and the end chambers, with the central chamber being bounded by identical cation permeable membranes. The dotted line in Fig. 2 indicates schematically the concentration changes occurring in solution films I and II.

The rate at which ions are removed from solution depends upon many factors among which are included the nature of the solution undergoing treatment, the chemical construction of the membranes, the temperature of the solution, the viscosity of the solution and the type of surface over which the solution flows, principally the surfaces of the membranes. As pointed out above, it is also true that although the density of the current applied across the unit has a direct bearing upon the rate of ion removal, a point is reached beyond which further increases in current density fail to effect a corresponding increase in the rate at which ions are removed from the solution. The effect of current density is shown in Fig. 3 in which current density is plotted against percent demineralization of the solution. Percent demineralization is defined here as the ratio of equivalents of electrolyte removed from the flowing solution to the total equivalents of ions carried in by the flowing solution. Where the linear velocity of the solution flowing upon the membranes is relatively low ($V_1$), the percent demineralization curve flattens out at a relatively low point. However, when the linear velocity of the solution is increased ($V_2$) (at the same volumetric flow rate) the point at which the curve flattens is substantially increased. An increase in velocity may produce no beneficial result if the current density is low. For example, if the current density applied across the unit is at the value X shown in Fig. 3, the efficiency of operation is not substantially affected by an increase in the linear velocity of the solution. The point Y represents the maximum current density permitting normal operation of a unit in which the linear velocity of the solution has the relatively low value $V_1$. If the current density be given the value Z, it is evident that the unit will achieve a higher percentage demineralization at the higher velocity $V_2$, and the value 0 represents the maximum current density of normal operation at the velocity $V_2$. I have not assigned numerical values to Fig. 3 because any given set of values would be true only for a particular set of circumstances or combination of factors as referred to above. For example, a change in temperature or a change in the nature of the solution would alter the values. However, the curves shown in Fig. 3 are true in a qualitative sense.

While it might be concluded from the above discussion that it would be best merely to flow solution through apparatus of the type disclosed in the copending applications previously referred to but at a faster rate, there are other factors which render it more desirable to increase the linear flow rate by altering the geometry of the unit, rather than by increasing the volumetric throughput rate. For example, as the throughput rate is increased for a unit of given size at a given current density, decreased percentage demineralization is obtained in that unit. To obtain the same percentage demineralization at the higher throughput rate, it is either necessary to increase drastically the size of the apparatus or to use many units in series. To choose another example, for a practical operation requiring the lower volumetric throughput rate with the high percentage demineralization one would have to operate many small units in series—with high throughput through each—in order to achieve the desirable high linear velocities without the use of a tortuous path. This entails serious practical disadvantages including high construction costs, material waste and operational difficulties. Finally, the use of a narrow tortuous path built into the spacer material separating the membranes provides mechanical support which is important under the pressure drops of flowing solution realized in this apparatus.

In Figs. 4 and 5 there is shown diagrammatically an electrolyte removal unit constructed in accordance with the invention. There is provided an outer casing 10, having an inlet 12, for (electrolyte containing) water and an outlet 14 so that water may be circulated through the unit. Mounted within the cell formed by the casing 10 is a membrane 16 which is selectively permeable to cations and a second membrane 18 which is selectively permeable to anions. Between the two membranes 16 and 18 and in face to face contact with the surfaces thereof is a spacer 20 in the form of a flat plate or sheet; this spacer is provided with a continuous cut-out portion forming tortuous channel 22, the channel being spanned at a few locations by patches 24 of very thin tough pellicle, such as Scotch tape or the like serving to hold the spacers together. The channel 22 communicates with a solution inlet 26 and with a discharge conduit 28. As is apparent from Fig. 5, solution entering the inlet 26 is caused to cross back and forth across the surfaces of the membranes 16 and 18, the solution being confined in its travel to the channel 22.

Within the casing 10 adjacent the membrane 16 is mounted an electrode 30, and a similar electrode 32 is mounted in the casing adjacent the membrane 18. Current is applied across the electrodes in such direction that the electrode 30 is positive with respect to the electrode 32. Negative ions contained in the solution passing through the channel spacer 20 migrate through the membrane 16 toward the positive electrode 30, while positive ions from the solution migrate through the membrane 18 toward the negative electrode 32. The migrating ions are carried off in the wash stream circulated through the casing 10, the level of water being shown at 34.

Certain dimensions of the assembly just described are of critical importance. The membranes utilized in this apparatus should be as thin as possible in order to reduce their ohmic resistance in the current path. Thus, even highly conducting ion-exchange membranes having a thickness exceeding 5 mm. cause such a high resistance in the apparatus that they become unsuitable for most practical uses. On the other hand if membranes of insufficient thickness are used, their mechanical weakness with respect to flexing even under small pressure drops renders them unsuitable for practical purposes. Furthermore, diffusion of salt or other electrolyte across a membrane is proportional to its thickness. Since this apparatus has inherently, in operation, a concentration gradient across each membrane, it is necessary to utilize a thickness exceeding a finite minimum permitting minimization of the concentration diffusion across the membrane. It has been found that membranes having a thickness of less than 0.1 mm. are practically unsuitable for the two reasons just stated. Therefore, the preferred range of membrane thickness is .1 to 5 mm.

The thickness of the spacer determines the thickness of the solution between two membranes. As is well known, it should be kept to a minimum to reduce here the ohmic resistance. On the other hand if the spacer is too thin, pressure drops in the channel, per unit path length, become excessive resulting in deflection of membranes and/or high pumping costs. For practical purposes I have found that spacer thicknesses ranging from 0.3 mm. to 5 mm. are preferred in that they are suitable for most practical applications.

Another dimension of critical importance is the width of the tortuous channel. The channel should be as wide as possible with respect to the width of the spacer material separating the folds on the channels in order to utilize a maximum percentage of membrane area. Further, when channels become too narrow, pressure drops per unit path length become excessive in addition to poor area utilization. On the other hand if the channels are too wide, insufficient tortuousity and therefore insufficient increase in linear velocity results in any given assembly. Furthermore, excessive width is apt to lead to membrane deflection and poor support. For practical purposes I have found that channels of the width between 0.1 mm. and 10 mm. constitute the preferred range.

From the above consideration it is clear that the ratio of channel width to spacer thickness is an important ratio determining the structural stability under pressure in the channel tending to deflect the membranes, for any given apparatus and solution. It has been found that this ratio, for most practical applications, should lie preferably between 1:1 and 25:1.

For similar reasons the ratio of channel width to membrane thickness is of critical importance; the preferred range for this ratio is 1:1 to 100:1.

Finally, preferred selectively permeable membrane materials complying with the geometrical limitations stated above without resulting in excessive ohmic resistance are conducting ion-exchange membranes described in copending applications Ser. No. 103,784, filed July 9, 1949, by Walter Juda and Wayne A. McRae, and Ser. No. 260,080, filed December 5, 1951, by John Thacher Clarke.

Within the above limitations the linear flow rate of most solutions over the membrane is relatively high and the unit so constructed can be operated with maximum efficiency and represents operation characterized by the curve $V_2$ of Fig. 3.

It has been found that in the utilization of membranes and spacers of large areas the use of a single tortuous channel having a thickness and width within the desired range would lead to channel having a length so great as to result in excessive pressure drops. Therefore two or more such channels have been used in each spacer of larger size. For example, with membranes having an area exceeding 0.5 sq. ft. it has been found preferable to use two or more such paths. These channels are preferably more or less parallel throughout their tortuous paths but may be more or less independent of each other. A number of possible variations are shown in Figs. 7, 8, 9 and 10. It is evident that the configurations of the tortuous path may be readily varied and multiplied within the scope of the invention.

Figure 7:
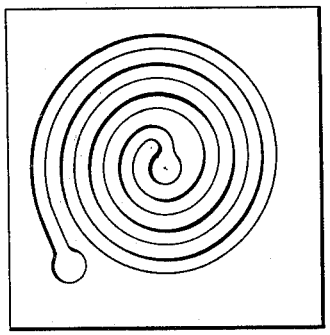
Figure 8:
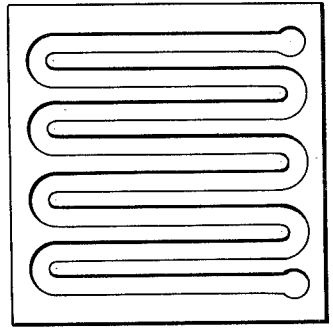
Figure 9:
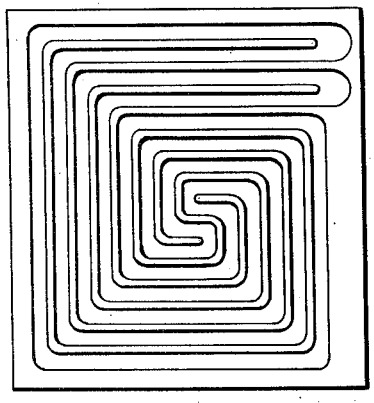
Figure 10:
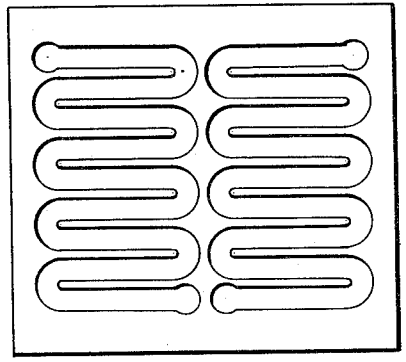

The spacer shown in Fig. 7 is provided with a spiral channel through which the solution to be treated may be passed either from the center outwards or vice versa. The spacer shown in Fig. 8 is provided with a channel formed as a folded path arranged so that the solution courses back and forth across the surfaces of the membranes. In Fig. 9 there is shown a quadruple spiral path in which four panels lead from the periphery in toward the center, or vice versa. In connection with the spiral form of panel, it is of course contemplated that the inner ends of the channels will be served by piping disposed internally of the unit. Fig. 10 illustrates a spacer provided with a pair of folded tortuous channels. An advantage resulting from the use of parallel channels is the fact that the unit is not put out of operation in the event one of the channels becomes clogged.

The unit shown in Fig. 2 is sharply limited in capacity. However, the combination of anion and cation membranes separated by a channelled spacer may be repeated to produce a unit of any desired capacity (Fig. 6). For example, such a repeating unit may have twenty-five such combinations arranged in parallel, the unit being also connected in series to additional similar units. In such a battery, every other chamber D bounded by a cation membrane C on the cathodic side and by an anion membrane A on the anodic side is an electrolyte-removing chamber ("diluting" chamber) whereas the chambers C in between the diluting chambers having the opposite membrane arrangements are electrolyte-receiving chambers ("concentrating" chambers). It is clear from examination of Fig. 1 that polarization films occur only in the diluting chambers, hence the tortuous channel is essential only in the diluting chambers. However smoother operation is obtained when tortuous channels similar though not necessarily identical to those in the diluting cells are also used in the concentrating cells.

The number of chambers in a unit and the number of units in a system depends upon the capacity for example in gallons per hour of solution which it is desired to treat and also upon the concentration of ions in the original solution. The more concentrated the solution the greater the number of units required.

Similarly, for repetitive action, the separation device shown in Fig. 2 may be multiplied as illustrated in copending application Ser. No. 213,514, filed March 2, 1951, by Davis R. Dewey II and Edwin F. Gilliland. In this case each chamber bounded by two identical membranes has one surface subject to the formation of polarization films and therefore may be more efficiently operated with a narrow tortuous channel.

Having described and illustrated preferred embodiments of the invention what is claimed as new and patentable is:

1. Apparatus for transferring ions of one solution to another comprising a plurality of perforated spacer members each disposed in face-to-face contact on one side with a selectively ion permeable membrane and on the other side with a selectively ion permeable membrane, said spacer members having continuous tortuous perforations therethrough and running in parallel to the faces in contact with said membranes to form tortuous path chambers, means for introducing a solution into one end of each chamber, and means for removing solution from the other end of each chamber, and means for flowing a direct electric current transversely through the membranes and chambers.

2. The apparatus of claim 1 adapted to modify the concentration of electrolytes in solution wherein the selectively permeable membranes are alternately selectively permeable to cations and selectively permeable to anions.

3. The apparatus of claim 1 adapted to separate ions of like charge wherein all the membranes are selectively permeable to ions of like charge.

4. The apparatus of claim 1 adapted to separate cations wherein all the membranes are selectively permeable to cations.

5. The apparatus of claim 1 adapted to separate anions wherein all the membranes are selectively permeable to anions.

6. In apparatus for transferring ions from one solution to another including a plurality of spaced selectively ion permeable membranes, the combination of a plurality of perforated spacer members, each spacer member being disposed in face-to-face contact on each side thereof with a selectively ion permeable membrane, said spacer members having continuous tortuous perforations therethrough and running in parallel relation to the faces in contact with said membranes to form tortuous path chambers between said membranes, means for introducing a solution into one end of each chamber, and means for removing solution from the other end of each chamber, and means for flowing a direct current transversely through the membranes and the chambers.

7. Apparatus for modifying the concentration of electrolytes in solutions comprising a plurality of perforated electrically insulating spacer members each disposed in face-to-face contact on one side with a conducting selectively cation permeable membrane and on the other side with a conducting selectively anion permeable membrane, said spacer members having continuous tortuous perforations therethrough and running in parallel relation to the faces in contact with said membranes to form tortuous path chambers between said membranes, means for introducing a solution into one end of each chamber, and means for removing solution from the other end of each chamber, and means for flowing a direct electric current transversely through the membranes and chambers.

8. Apparatus for transferring ions from one solution to another comprising a plurality of perforated spacer members each disposed in face-to-face contact on both sides thereof with selectively permeable ion-exchange membranes, said spacer members each having a plurality of continuous tortuous perforations therethrough and running in parallel relation to the faces in contact with said membranes forming tortuous path chambers between said membranes, means for introducing a solution into one end of each chamber, and means for removing solution from the other end of each chamber, and means for flowing a direct electric current transversely through the membranes and chambers.

References Cited in the file of this patent

UNITED STATES PATENTS

| 2,252,213 | Skolnik | Aug. 12, 1941 |
| 2,689,826 | Kollsman | Sept. 21, 1954 |

FOREIGN PATENTS

| 689,674 | France | June 2, 1930 |
| 993,345 | France | July 25, 1951 |
| 682,703 | Great Britain | Nov. 12, 1952 |
| 67,903 | Holland | Dec. 15, 1950 |